United States Patent
Arms et al.

[19]

[11] Patent Number: 5,887,351
[45] Date of Patent: Mar. 30, 1999

[54] INCLINED PLATE 360 DEGREE ABSOLUTE ANGLE SENSOR

[75] Inventors: Steven W. Arms; Christopher P. Townsend, both of Burlington; Steven W. Mundell, Williston, all of Vt.

[73] Assignee: MicroStrain Co., Inc., Burlington, Vt.

[21] Appl. No.: 782,393

[22] Filed: Jan. 13, 1997

[51] Int. Cl.⁶ .................................................. G01B 7/30
[52] U.S. Cl. ................................... 33/1 PT; 33/534
[58] Field of Search .................. 33/1 N, 1 PT, 33/511, 512, 534, 465, 471, 504, 784, 366

[56] References Cited

U.S. PATENT DOCUMENTS

| | | | |
|---|---|---|---|
| 3,906,339 | 9/1975 | Leisterer | 33/1 PT |
| 4,394,801 | 7/1983 | Thibodeaux | 33/471 |
| 4,771,548 | 9/1988 | Donnery | 33/1 N |
| 4,972,599 | 11/1990 | Ernst | 33/1 PT |
| 5,163,228 | 11/1992 | Edwards et al. | 33/1 PT |
| 5,263,492 | 11/1993 | Voyce | 33/471 |
| 5,311,666 | 5/1994 | Jacobsen et al. | 33/1 N |
| 5,446,966 | 9/1995 | Ishizaki | 33/1 PT |
| 5,469,862 | 11/1995 | Kovacevic | 33/512 |
| 5,475,931 | 12/1995 | Wei | 33/471 |
| 5,594,434 | 1/1997 | McCullough | 33/1 PT |

FOREIGN PATENT DOCUMENTS

| | | | |
|---|---|---|---|
| 2639708 | 6/1990 | France | 33/1 PT |
| 1-169308 | 7/1989 | Japan | 33/1 PT |

*Primary Examiner*—G. Bradley Bennett
*Attorney, Agent, or Firm*—Thomas N. Neiman

[57] ABSTRACT

The novel inclined plate 360 degree absolute angle sensor is designed to measure the absolute angle created by a base and a rotating surface. The assembly contains a metal inclined plate positioned above four coils so that coils one and two are at the minimum and maximum distance from the plate respectively, while at the same time, coils three and four are equidistant from the inclined plate. Rotation of the plate around a centerline, changes the distance that all four coils with respect to the inclined plate which, in turn, creates a change of the inductance of the coils. This change in inductance may be measured with alternating current bridge technologies in order to provide a measure of absolute angular position of a rotating surface with respect to the base.

8 Claims, 7 Drawing Sheets

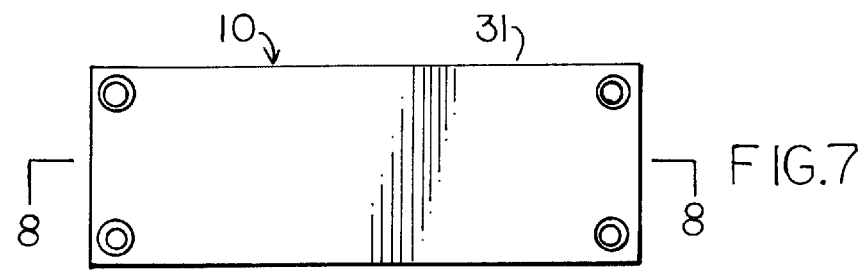
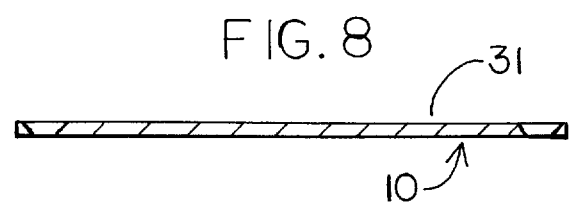
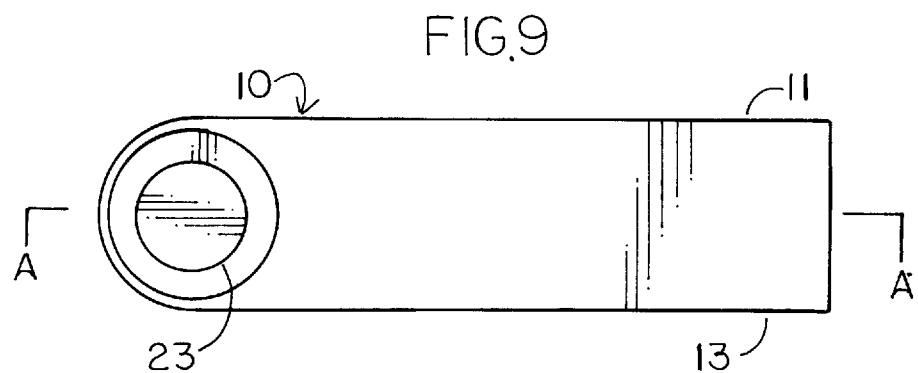

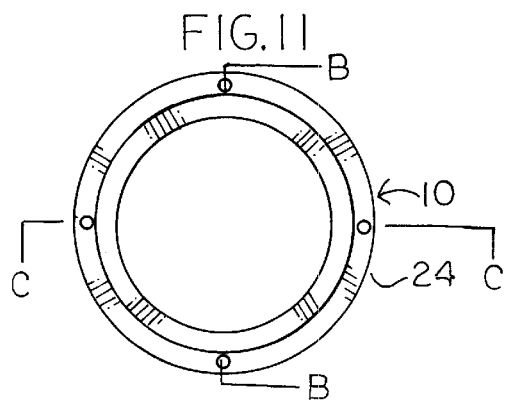
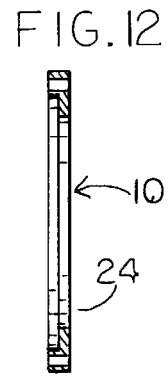
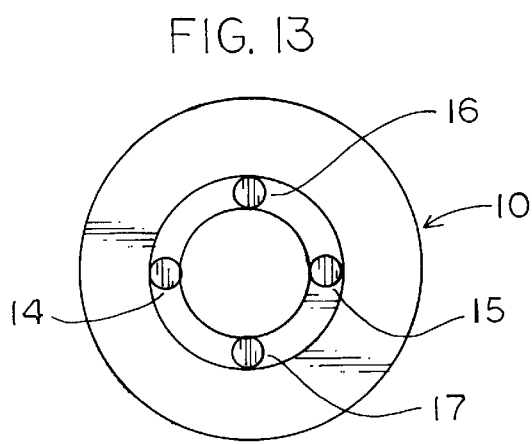
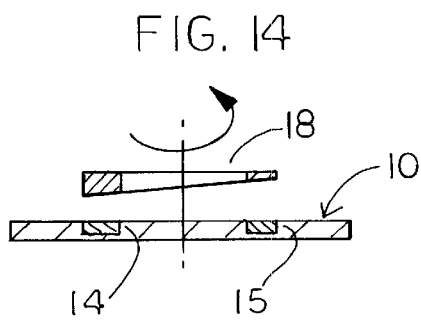
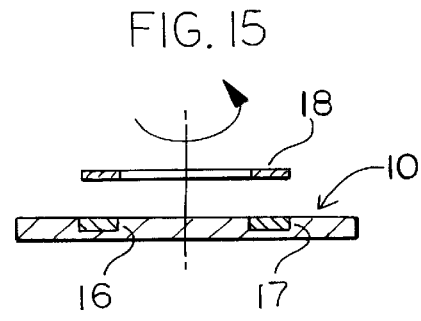

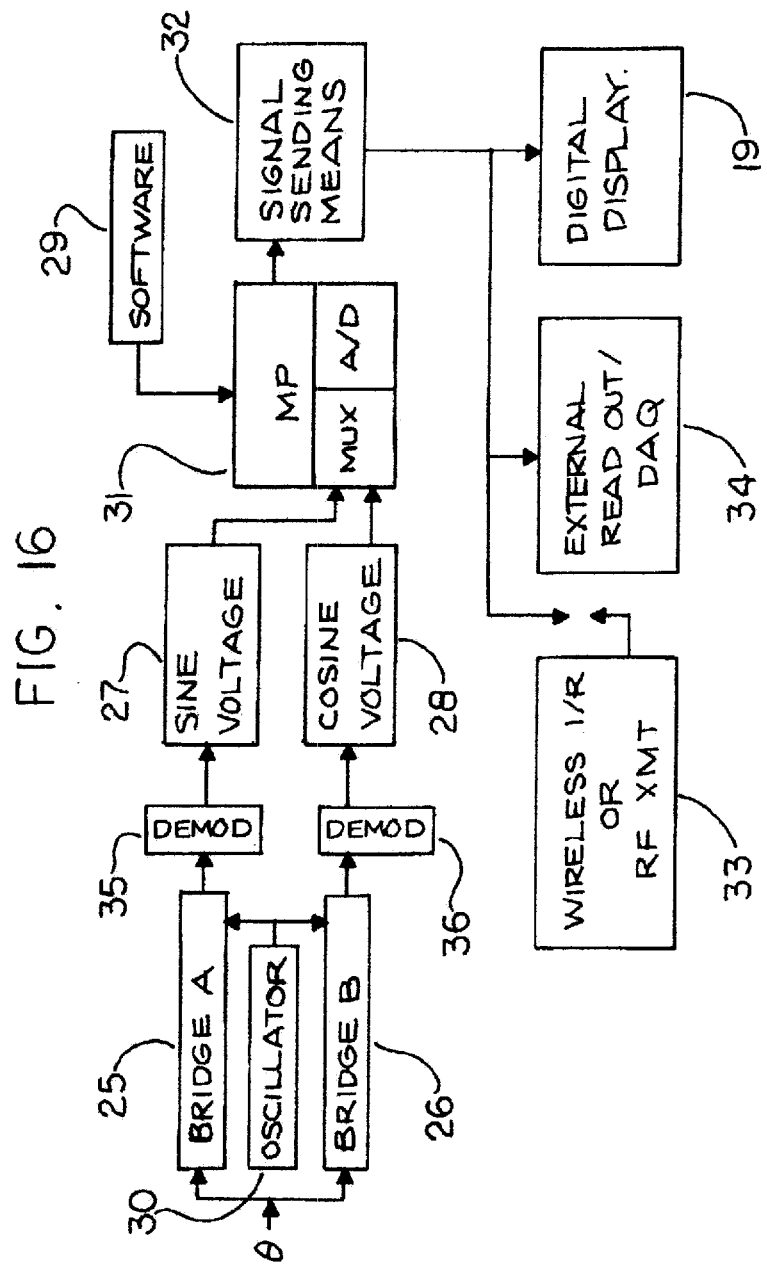

INCLINED PLATE 360 DEGREE ABSOLUTE ANGLE SENSOR

BACKGROUND OF THE INVENTION

This invention pertains to devices for measuring angles in a small sized instrument and, in particular, to an inclined plate 360 degree absolute angle sensor for use in biomedical, industrial, commercial and personal applications, such as measuring the angles of various body joints or the angles of implants or bones taken from radiographic images.

There have been a number of attempts to develop angle measuring units. Examples of this type device are the United States Patent issued to Graham, Baillet and Sankey U.S. Pat. No. 4,442,606 issued on 17 Apr. 1984 for a Digital Goniometer is an example of this typical units. Other attempts in this area include the United States Patents issued to Joyal et al, U.S. Pat. No. 3,996,670 issued on December 1976 and to Beck, U.S. Pat. No. 4,249,314 issued in February 1981. There are, however many difficulties with those type devices. Among the difficulties are moisture problems, problems created by dirt and limitations of visibility and motion. Potentiometers wear out over time, usually have a travel stop which limits their rotatability and are not transparent.

What is needed is an inclined plate 360 degree absolute angle sensor that does not wear out over time and has an unlimited 360 degree resolution. What is needed is an assembly which is simple and easy to use, has a complete range of motion and allows complete visibility for the operator to measure any desired angle. What is also needed is signal sending means that allows the data from the sensors to be processed by a micro controller or personal computer.

It is the object of this invention to teach an inclined plate 360 degree absolute angle sensor which avoids the disadvantages and limitations, recited above in similar systems. Another object of this invention is to provide a system that is extremely efficient and accurate.

SUMMARY OF THE INVENTION

Particularly, it is the object of this invention to teach an inclined plate 360 degree absolute angle sensor, for use in medical, industrial, commercial and personal applications to measure a relative or rotational angle, comprising a housing; said housing having a base; said base having at least one non contacting sensor; said housing further having a rotating surface; said rotating surface comprising an inclined plate, said inclined plate designed to maintain a varying distance from said sensor; said housing further having signal sensing means from said sensor; said housing further having analyzing means,: and said housing further having a power source.

BRIEF DESCRIPTION OF THE DRAWINGS

Further objects and features of this invention will become more apparent by reference to the following description taken in conjunction with the following figures, in which:

FIG. 7 is a top plan of the cover of the assembly;

FIG. 8 is a cross sectional view taken along line 8—8 of FIG. 7;

FIG. 9 is a top plan view of the rotating arm of the assembly;

FIG. 10 is a cross sectional view taken along line A—A of FIG. 9;

FIG. 11 is a top plan view of the restraining ring of the assembly;

FIG. 12 is a cross sectional view taken along line B—B of FIG. 11;

FIG. 13 is a view of the rotation of arms one and two in order to create an angle;

FIG. 14 is a view of the rotation over coils one and two;

FIG. 15 is a view of the rotation over coils three and four;

FIG. 16 is a block diagram of the novel electronic components of the assembly;

DETAILED DESCRIPTION OF THE PREFERRED EMBODIMENT

Figure 1:
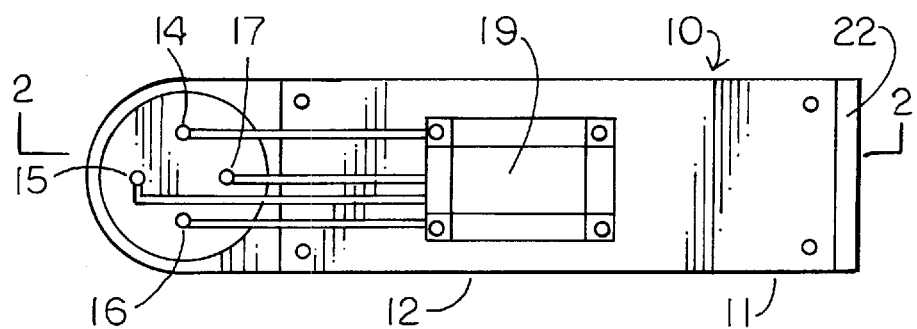
FIG. 1 is a top plan view of the base of the assembly.
Figure 2:
FIG. 2 is a cross sectional view thereof taken along line 2—2 of FIG. 1.
Figure 3A:
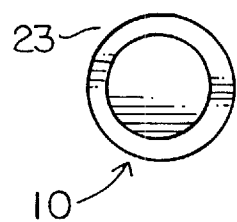
FIG. 3(a–c) show 3 views of the novel cuff assembly.
Figure 3B:
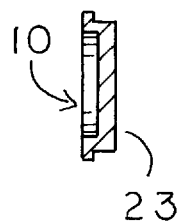
Figure 3C:
Figure 4:
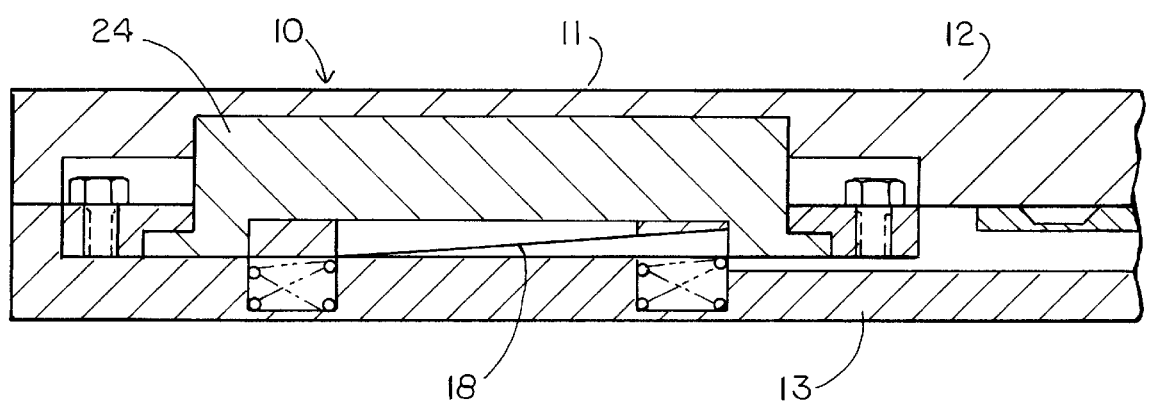
FIG. 4 is a cross sectional view of the inclined plate 360 degree absolute angle sensor.
Figure 5:
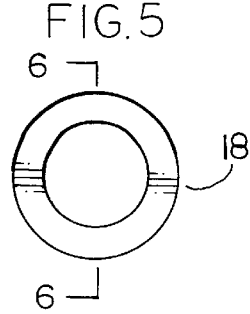
FIG. 5 is a top plan view of the inclined plate of the assembly.
Figure 6:
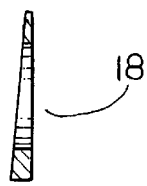
FIG. 6 is a cross sectional view thereof taken along line 6—6 of FIG. 5.

As shown in the figures, the sensor assembly 10 comprises a housing 11 that is comprised of two arms 12 and 13 which can be constructed of transparent plastic or can be opaque with a clear viewer installed. The primary or first arm 12 contains the angle sensing electronics which includes the four coils 14, 15, 16 and 17. The secondary arm 13 contains the angled or inclined plate or disc 18. A digital display 19 is incorporated into the primary arm 12 along with a cross hairs centering device 20 positioned within a clear view port 21. The radius of the secondary arm 13 allows the unit to move three hundred sixty degrees in relation to primary arm 12. A radius slot 22 in the primary arm 12 allows this motion. The angled plate 18 is fastened into a rotating cuff 23 and then the retaining ring 24 is placed over the rotating cuff and attached to the primary arm 12. The top of the rotating cuff 23 is attached to secondary arm 13.

The angled plate or disc 18 within secondary arm 13 rotates above the four coils 14, 15, 16 and 17 contained in primary arm 12. As the disc rotates, the inductance of each coil changes due to the change in distance, or the air gap between the coils and the angled disc. If the angled disc is made of a conductive material, the change of coil inductance is caused by eddy currents generated by the angled disc which causes a reduction in the impedance of the coil. If the angled disc is made of a ferrous material, the change in coil inductance is caused by the change in shape of the magnetic field around the coil due to the apparent change in the permeability of the surrounding materials. The output from the coils 14 and 15 is differential as is the output from coils 16 and 17. The outputs from coils 14 and 15 are sent to wheatstone bridge 25 and the outputs from coils 16 and 17 are sent to wheatstone bridge 26. The oscillator 30 provides excitation to the wheatstone bridges 25 and 26. The differences between their inductance is measured by a demodulator 35 and demodulator 36. The sine and cosine voltages 27 and 28 are outputs from the demodulators 35 and 36. Alternatively, the frequency difference method may be used.

Figure 17:
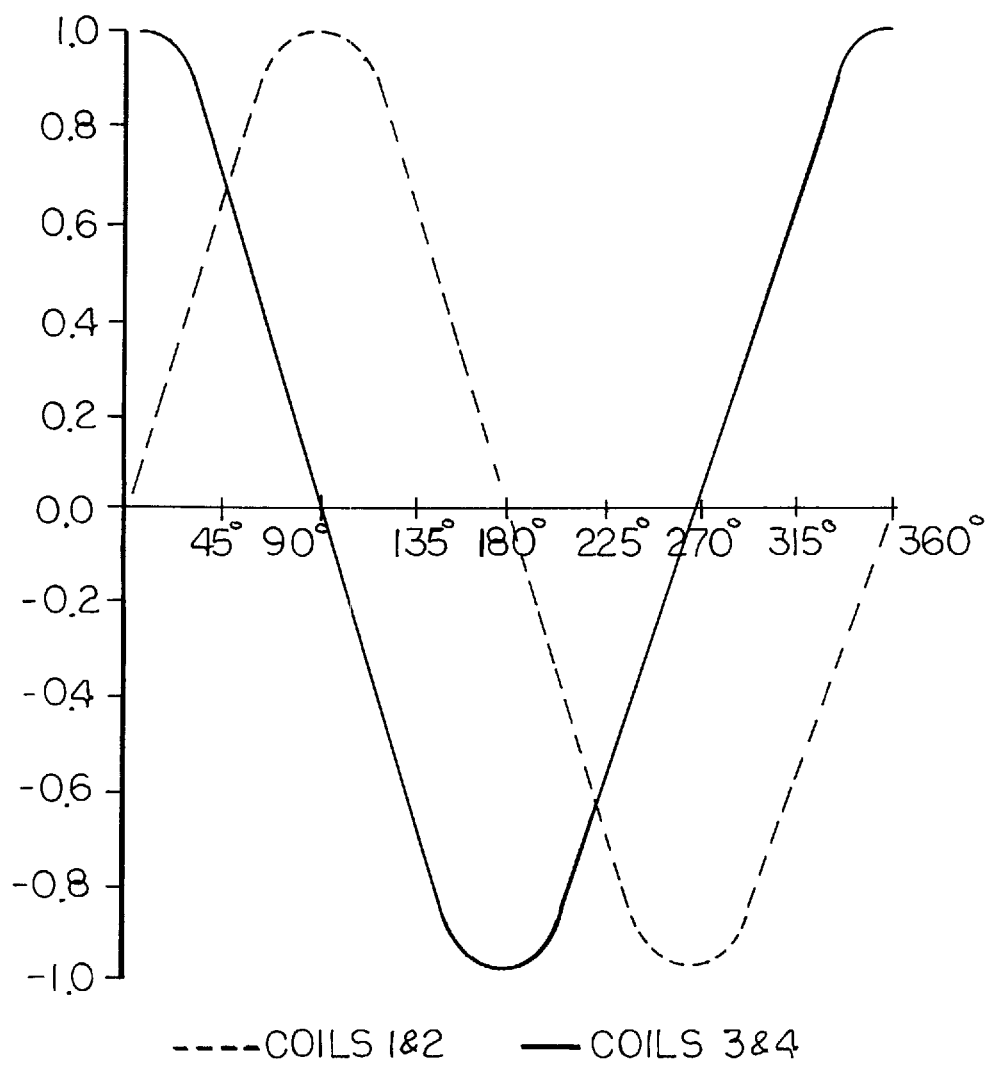
FIG. 17 is a graph of the plots of the outputs during the rotation of the assembly.
Figure 18:
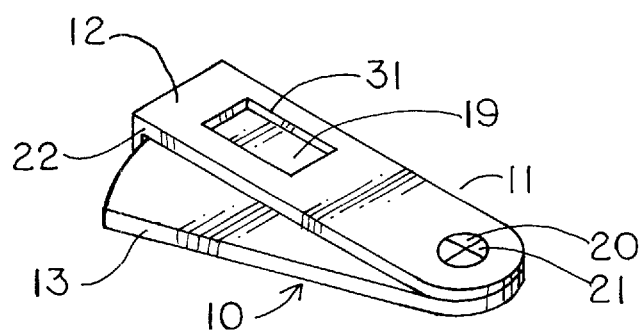
FIG. 18 is a perspective view of the novel inclined plate 360 degree absolute angle sensor.

The measured output is sinusoidal. Wheatstone bridge 26 is ninety degrees out of phase with wheatstone bridge 25 thus representing a cosine curve. A graph of the results is shown in FIG. 17. These outputs are then processed in microprocessor 31 and interpreted by the software program 29 that takes the arc tangent of the sine and the cosine outputs to convert the sensor readings into an output angle from zero to three hundred and sixty degrees. Arc tangent can be calculated from a table or from a mathematical equation. The output angle is then sent via the circuit (signal sending means 32 to the digital display 19 or to a personal computer by means of a wireless data transmission 33 or an external read out 34.

Figure 19A:
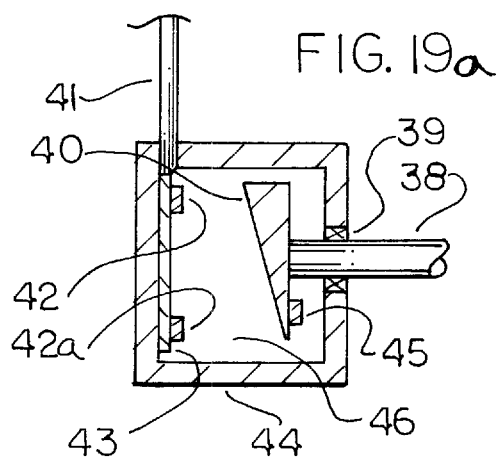
FIG. 19(a–b) show two views of the inclined plate 360 degree absolute angle sensor used in a shaft embodiment.
Figure 19B:
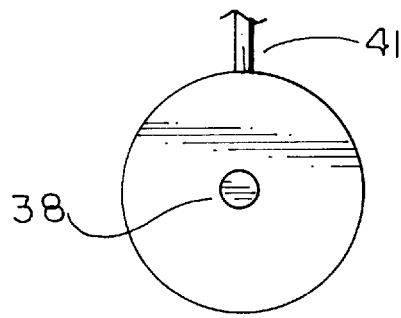

The shaft embodiment shown in FIG. 19 shows a shaft 3B that can be attached to a rotating device is held captive and supported with a bushing or bearing 39 and then attached to the inclined plate 40. The bearing are mounted in a housing 44. The coils 42 are positioned on a circuit board base 43 at a fixed radial location from the center of the axis of rotation of the inclined plate 40 and within the housing 44. Signal conditioning electronics may also be mounted on or around the circuit board 43. A cable 41 may be used for data transmission. A counterbalance 45 can be used to balance the inclined plate 40 for dynamic measurement applications in order to minimize system vibrations that may result from fast rotations of the unbalanced plate 40. The counterbalance 45 can also be used to deliberately unbalance the inclined plate 40 so that it can be used as an inclinometer. In that case, the weight 45 will cause the inclined plate 40 to seek it lowest potential energy, such that the weight 45 will align directly downward coincident with the earth's gravitational vector. A viscous fluid 46 may be contained within the housing 44 to prevent unwanted oscillation of the device, especially when used as an inclinometer.

The operation of the novel inclined plate 360 degree absolute angle sensor is designed to provide a number of advantages over current devices which include potentiometers or encoders. Potentiometers tend to wear out over time and usually do not allow the device to rotate three hundred and sixty degrees as they contain a stop of some kind. They are not transparent and they can not be operated in moist conditions. Encoders have limited resolution because of spacing or grading unless very costly etching on glass is used. The applicants' device never wears out and rotates three hundred and sixty degrees. Because inductance is not affected by water, the assembly can get wet and operate properly. The assembly's resolution is only limited by the noise of the electronics. The measurement based upon the variable proximity of an angled or inclined disc to a set of two pairs of differential variable reluctance transducers or coils. As the disc rotates over the three hundred sixty degree range, the gap between the angled disc varies by the sine of the rotation angle. Pairs of coils or sensing inductors are mounted one hundred eighty degrees out of phase along the periphery of the angled disc in order to experience opposite gaps relative to the inclined disc. This arrangement produces a differential response from the sensing inductor pairs, which amplifies the output and cancels the temperature effects.

While we have described our invention in connection with specific embodiments thereof, it is clearly to be understood that this is done only by way of example and not as a limitation to the scope of our invention as set forth in the objects thereof and in the appended claims.

We claim:

1. An inclined plate 360 degree absolute angle sensor, for use in medical, industrial, commercial and personal applications to measure a relative or rotational angle, comprising:

a housing;

said housing having a base;

said base having at least one non contacting sensor;

said housing further having a rotating surface;

said rotating surface comprising an inclined plate with the relative rotation of said inclined plate and said non contacting sensor causing the distance between said inclined plate and said non contacting sensor to be varied; and said housing further having signal sending means from said sensor.

2. An inclined plate 360 degree absolute angle sensor, according to claim 1, wherein:

said base of said housing comprises a primary arm unit; and said rotating surface of said housing comprises a secondary arm unit.

3. An inclined plate 360 degree absolute angle sensor, according to claim 2, wherein:

said arms units having a reference point a distance "L" from the vertex whereby an analyzing unit can calculate the distance "D" between the reference points on said primary and said secondary arm units.

4. An inclined plate 360 degree absolute angle sensor, according to claims 1, wherein:

said housing comprises a unit of rigid construction;

said unit of rigid construction comprises a transparent material; and said unit of rigid construction further comprises an opaque material with a transparent viewing means.

5. An inclined plate 360 degree absolute angle sensor, according to claim 2, wherein:

said primary arms unit having slot receiving means for allowing passage of said secondary of said arm unit to pass in close proximately thereby and allow said second of said arm unit to move in a complete three hundred and sixty degree rotation.

6. An inclined plate 360 degree absolute angle sensor, according to claim 2, wherein:

said sensor comprises inductive means;

said inductive means comprises a plurality of coils positioned equidistant apart and mounted within said primary of said arm units;

said sensor comprises capacitive means; and said capacitive means comprises a plurality of printed electrodes positioned equidistant apart and mounted within said primary of said arm units.

7. An inclined plate 360 degree absolute angle sensor, according to claim 2, wherein:

said inclined plate comprises targeting means positioned within a recess within said secondary arm unit;

said inclined plate having a rotating cuff housing positioned within said recess within said secondary arm unit and attached thereto; and said inclined plate further having a restraining ring positioned over said rotating cuff housing and attached to said primary arm unit.

8. An inclined plate 360 degree absolute angle sensor, according to claim 7, wherein:

said inclined plate comprising a unit of conductive material; and said inclined plate comprising a unit of ferrous material.

\* \* \* \* \*